United States Patent [19]
Aprill, Jr.

[11] Patent Number: 4,584,876
[45] Date of Patent: Apr. 29, 1986

[54] AIR COMPRESSOR TEST APPARATUS

[75] Inventor: Theophil Aprill, Jr., Ann Arbor, Mich.

[73] Assignee: Allied, Inc., Ann Arbor, Mich.

[21] Appl. No.: 702,280

[22] Filed: Feb. 15, 1985

[51] Int. Cl.$^4$ .......................................... G01M 19/00
[52] U.S. Cl. ..................................... 73/168; 374/143; 415/118; 137/599.1
[58] Field of Search ................... 73/168, 112; 415/118; 374/143; 137/599.1

[56] References Cited

U.S. PATENT DOCUMENTS

| | | | |
|---|---|---|---|
| 2,198,411 | 4/1940 | Love | 73/168 |
| 2,733,600 | 2/1956 | Sahs et al. | 73/168 |
| 2,970,474 | 2/1961 | Kendig | 73/168 |
| 3,002,380 | 10/1961 | Grove | 73/168 |
| 3,091,116 | 5/1963 | Crooks | 73/168 |
| 3,747,404 | 7/1973 | Novak | 73/168 |

FOREIGN PATENT DOCUMENTS 0629360 9/1978 U.S.S.R. .............................. 73/112

Primary Examiner—Charles Frankfort
Assistant Examiner—Thomas B. Will
Attorney, Agent, or Firm—Stephenson and Boller

[57] ABSTRACT

Test apparatus for on-site testing of an air compressor to obtain a measurement from which the operating efficiency of the air compressor and air flow rate may be calculated to enable the owner of the compressor to determine whether replacement or rebuilding of the compressor is justified. The apparatus comprises an inlet for connection to the air compressor being tested and branch circuits through which the air flow from the compressor is selectively passed. Each branch circuit contains a particular size orifice and an associated shut-off valve, and the condition of the shut-off valves determines the orifice selection. The orifice selection is made to match the running compressor and attain a balanced condition. In this regard a pressure regulator and by-pass control valve, in parallel with each other, are also in the test apparatus for adjustment to obtain the balanced condition. Once balance has been attained, pressure and temperature measurements are taken and the power input to the compressor is also measured. These measurements are then used in calculating the compressor's efficiency.

11 Claims, 3 Drawing Figures

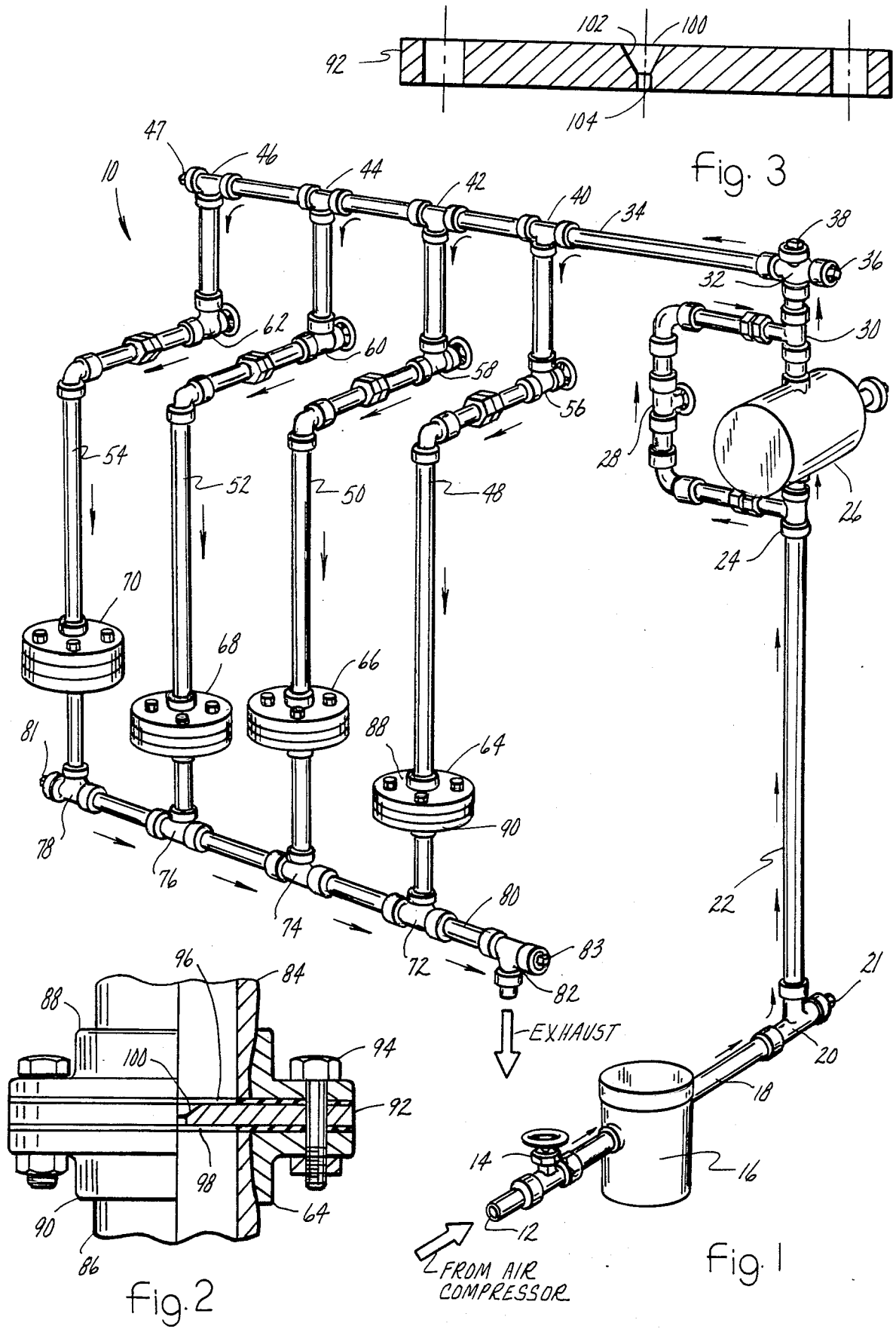

AIR COMPRESSOR TEST APPARATUS

BACKGROUND AND SUMMARY OF THE INVENTION

This invention relates to an apparatus for use in testing the efficiency of an air compressor system (consisting of compressor and drive) and as a related aspect a method for the testing of the efficiency of an air compressor. The preferred embodiment of the invention is particularly adapted for on-site testing of air compressors in existing installations.

Pneumatic systems (i.e. compressed air systems) are in widespread use, such as in manufacturing plants and service stations. Compressed air is used as a power source for many applications, such as for penumatic tools and equipment and for pressurizing inflatable devices such as tires and the like.

In many typical installations an air compressor is associated with a compressed air storage tank, and the compressor operates whenever the storage pressure drops below a certain level. By using a storage tank, the compressed air system has an adequate supply available for peak demands, and yet during periods of lower demand, can be replenished by operation of the air compressor. An air compressor is typically sized on the basis of expected demand, and therefore, there is a wide range of compressor sizes in actual use, each one's size depending upon the expected demands for the particular installation.

As is the case for virtually all mechanical devices, continuing usage of an air compressor eventually results in the compressor becoming less efficient. The extent of the inefficiency may not be readily apparent because the increased costs incurred for powering the compressor are often lumped into general power costs for the plant or service station. In other words, while a compressor may continue to perform adequately, the power input to run the compressor may progressively increase with time and in this way constitute a significant hidden cost of operating the plant or service station.

The present invention is directed to a novel apparatus for testing of the efficiency of an air compressor system, and it has the particular advantage of not requiring the compressor to be disconnected and transported to a test facility. In other words the testing can be done on-site and simply involves connecting the test apparatus in the on-site installation and then running the compressor for a brief amount of time to acquire information sufficient to calculate the efficiency of the compressor system. On the basis of the information obtained through use of the test apparatus, a calculation of the compressor's efficiency is made. The owner of the compressor can then decide whether the efficiency has become low enough to warrant replacement or rebuilding of the compressor.

In addition to the ability of the present invention to provide on-site testing of a compressor, a single test apparatus is adapted to testing a wide range of compressor sizes. Moreover, the apparatus can be used regardless of the type of power used to drive the compressor. Typical compressors are driven either by electric motors or by gas powered engines. Therefore the power input to a compressor during the test procedure can be readily ascertained by measuring either the electric power input in the case of an electric motor driven compressor or by the fuel input to the engine in the case of an engine driven compressor.

The apparatus of the present invention also has the advantage that it can be fabricated entirely from standard parts and/or parts which can be readily fabricated. The preferred embodiment of the invention disclosed herein comprises a number of shut-off valves, pipes and fittings, all standard parts, and it also includes a set of orifice plates which can be readily fabricated.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a perspective view of test apparatus embodying principles of the present invention, FIG. 2 is an enlarged fragmentary view, partly in section, of a portion of the test apparatus shown in FIG. 1 and enlarged, and FIG. 3 is an enlarged cross sectional view of one of the component parts of the structure shown in FIG. 2.

DESCRIPTION OF THE PREFERRED EMBODIMENT

FIG. 1 illustrates an exemplary presently preferred embodiment of test apparatus 10 according to the present invention. Apparatus 10 comprises an inlet 12 for connection to the outlet of an air compressor to be tested.

A shut-off valve 14 and an oil and water trap 16 are connected in a pipe line 18 which extends from inlet 12. A tee 20 comprises a removable plug 21 to provide a tap for connection to a pressure gauge which measures main line pressure. The test apparatus can therefore be conveniently connected in most conventional pneumatic systems.

A pipe line 22 forms a continuation of line 18 extending from tee 20 to a tee 24. Tee 24 provides for the branching of line 22 to a pressure regulator 26 and a by-pass control valve 28. The two branches rejoin at a tee 30. With this arrangement it can be appreciated that by-pass control valve 28 and pressure regulator 26 are connected in a parallel circuit relationship.

A cross 32 extends the circuit to a pipe line 34 and also provides two taps for sensing conditions during test. One tap 36 is used for sensing temperature and the other tap 38 is used for sensing total pressure. The taps are shown closed by removable plugs, but during test they are removed and appropriate sensing devices are threaded into the taps.

Pipe line 34 leads to a series of four tees 40, 42, 44 and 46. A corresponding branch 48, 50, 52 and 54 is associated with each of the four tees 40, 42, 44 and 46, respectively, and the four branches are essentially identical. The last tee 46 is plugged at 47.

Each branch 48, 50, 52, 54 contains a corresponding shut-off valve 56, 58, 60 and 62, respectively, and a corresponding orifice plate assembly 64, 66, 68 and 70, respectively. As can be seen from consideration of FIG. 1 each branch has a shut-off valve upstream of the corresponding critical flow orifice plate assembly. This means there is the velocity of sound at the orifice.

The orifice plate assemblies 64, 66, 68, and 70 in turn connect to corresponding tees 72, 74, 76, and 78, respectively, and these tees are in common in a pipe line 80 which leads to a tee outlet 82 at which air is exhausted. Tees 78, 82 are plugged at 81, 83.

FIGS. 2 and 3 illustrate representative details of orifice plate assembly 64. The branch contains two confronting pipes 84, 86. Around the outside of each of the confronting pipe ends is a circular ring. 88 is the ring on pipe 84 and 90 is the ring on pipe 86. The rings are affixed to the pipes in any suitable manner, and comprise circular radial flanges flush with the ends of the pipes.

A circular orifice plate 92 is captured between the two rings 88 and 90. The OD of plate 92 corresponds to the OD of the ring flanges and there are suitable aligned holes provided in the rings and orifice plate for fasteners 94, nuts and bolts for example, which securely clamp the orifice plate between the two confronting pipes and rings in a sealed manner. Sealing may be accomplished by placing gaskets 96, 98 respectively on opposite faces of the orifice plate in the manner shown in FIG. 2. The illustrated pattern for the fasteners comprises four fasteners arranged 90 degrees apart.

Orifice plate 92 comprises a central orifice 100. The illustrated orifice comprises a frusto-conical taper 102 leading to a circular cylindrical portion 104. The orifice is located on the axis of the two confronting pipes 84, 86. The orifice is made of a known precise size, particularly the portion 104.

The construction of the four orifice plates assemblies 64, 66, 68 and 70 in the preferred embodiment are exactly the same except for the sizes of the orifices. Each orifice plate assembly has a different sized orifice. For example each orifice plate assembly is adapted for a particular flow rate range, and the following chart illustrates exemplary ranges for examplary size orifices in ⅜" orifice plates, preferably brass or other non-corrosive metal.

| Orifice Plate Assembly | Length of Orifice Portion 104 | Diameter of Orifice Portion 104 | Flow Rate Range (SCFM) |
|---|---|---|---|
| 64 | 0.125" | 0.100" | 6–16 |
| 66 | 0.125" | 0.150" | 14–36 |
| 68 | 0.125" | 0.200" | 25–64 |
| 70 | 0.125" | 0.300" | 56–145 |

The typical testing procedure is as follows. The compressor is connected to inlet 12, and tee 20 is connected to the mail line pressure gauge. Appropriate pressure and temperature instrumentation is connected to cross 32.

Valve 14 is opened and the compressor is operated. The main line pressure is set by regulator 26 and is monitored by pressure sensing instrumentation connected to tap 21 in cross 20. Appropriate adjustments of pressure regulator 26 and by-pass control valve 28 are made to produce a substantially steady measurable main line pressure reading with the compressor continuously running. In other words the apparatus is "balanced" to the compressor. The appropriate orifice selection is made singly or in parallel by the selective opening and closing of the shut-off valves 56, 58, 60, and 62 such that the pressure reading at tap 21 is at least 1.9 times the pressure at discharge tap 82, normally atmospheric pressure.

Since it is known which shut-off valves 56, 68, 60 and 62 are open and closed, the particular orifice selection is known, and hence also the specific restriction imposed on the compressed air delivered by the running compressor. Having taken measurement of the resulting line pressure at cross 32, and compressure inlet pressure and temperature, the ideal power required to deliver the measured rate of compressed air is determined. This is because the ideal power is related to the pressure increase and flow rate.

Concurrent with the pressure measurement is a measurement of the power input to the compressor-drive. This can be done for example by a wattmeter connected to the electrical power line to the electric motor in the case of an electric motor driven compressor, and in case of an engine driven compressor, the fuel flow rate to the engine can be measured.

It is also necessary to take the temperature measurement at one of the taps across 32 so that an accurate determination of air density at cross 32 can be determined. Once the appropriate measurements have been taken, the efficiency of the compressor can be determined by relating the ideal power to the compressor-drive input power. On the basis of this calculation the owner of the compressor can determine whether it is appropriate to repair or replace the compressor.

For any given compressor, one test may be sufficient. Alternatively it may be deemed desirable to perform plural tests so that readings can be obtained at different main line pressure settings, and these may include readjustment at different settings. The actual amount of testing will depend upon the particular compressor installation.

In adjusting the test apparatus the objective is to seek a balanced condition during which the compressor runs continuously at a fixed main line pressure and for a particular combination of open and closed shut-off valves 56, 58, 60 and 62. If a particular setting of main line pressure and of shut-off valves 56, 58, 60 and 62 is incorrect, this fact will become known either by the inability to maintain a measurable pressure (i.e. orifice selection too large) or by the compressor shutting off (i.e. orifice selection too small). The measurements which are obtained may be processed manually or by means of a computer containing a suitable program. In the case of multiple readings, use of a computer will enable the efficiency calculations to be most quickly obtained. The calculations can be performed by use of conventional formulae relating to the various parameters.

The illustrated embodiment comprises the various adjustable component parts (i.e. shut-off valves, by-pass control valve, and pressure regulator) manually operable by individual manual operators. A more elaborate embodiment could provide for automatic operation from a master panel. Also, use of barometric pressure measurement to account for variations of atmospheric pressure, and temperature measurement of compressor inlet air can be added to implement ideal power calculation.

The foregoing has disclosed a unique apparatus for testing the efficiencies of air compressors on site. While a preferred embodiment has been disclosed, it will be appreciated that principles are applicable to other embodiments.

I claim:

1. Apparatus for use in testing the efficiency of an air compressor comprising an inlet for receiving compressed air delivered by a running air compressor, an outlet through which compressed air received at the inlet is exhausted, and circuit means between said inlet and said outlet through which compressed air passes, and an orifice plate arranged in said circuit means generally transverse to the direction of compressed air flow through said circuit means, said plate comprising a fixed orifice of known size through which the compressed air flow passes and selectively operable means for creating a predetermined pressure relationship between said orifice means and said air compressor which is being tested, such that measurements taken from selected points in said circuit means are used to calculate the air compressor efficiency while the air compressor is running.

2. Apparatus as set forth in claim 1 in which said plate is axially captured between a pair of rings at confronting ends of a pair of pipes, and including means for fastening said rings and plate together in a sealed relationship and with the fixed orifice disposed in alignment with the confronting ends of said pair of pipes.

3. Apparatus for use in testing the efficiency of an air compressor comprising an inlet for receiving compressed air delivered by a running air compressor, an outlet through which compressed air received at the inlet is exhausted, and circuit means between said inlet and said outlet through which compressed air passes, said circuit means including plural orifices in parallel relation with each other and means for selectively allowing and disallowing said orifices to pass the compressed air flow passing through said circuit means to thereby enable the selection of one of said orifices at which a compressor being tested can run continuously at a predetermined measurable pressure in said circuit means such that measurements taken from selected points in said circuit means are used to calculate the air compressor efficiency while the air compressor is running.

4. Apparatus as set forth in claim 3 in which said means for selectively allowing and disallowing said orifices to pass the compressed air flow passing through said circuit means comprises a shut-off valve for each such orifice, each such shut-off valve being arranged in series relationship with the corresponding orifice, and each series shut-off valve and orifice being arranged in parallel circuit relationship with each other in said circuit means.

5. Apparatus as set forth in claim 4 in which said orifices are arranged in common with said outlet.

6. Apparatus as set forth in claim 4 in which each shut-off valve is arranged upstream of the corresponding orifice.

7. Apparatus as set forth in claim 3 in which said orifices are of different sizes.

8. Apparatus as set forth in claim 7 in which each of said orifices is disposed centrally in a circular plate which is axially captured between circular rings on the outside of confronting ends of a pair of pipes and means for fastening each pair of rings and the corresponding plate together in a sealed relationship with each orifice in alignment with the confronting ends of the corresponding pair of pipes.

9. Method for use in testing the efficiency of an air compressor by means of apparatus comprising an inlet for receiving compressed air delivered by a running air compressor and an outlet through which compressed air received at said inlet is exhausted, and circuit means between said inlet and said outlet through which compressed air passes, said circuit means comprising orifice means of known characteristic through which the compressed air passes and selectively operable means for selectively creating a correlation of said orifice means with an air compressor being tested such that a predetermined measurable operating condition on the apparatus to be used in calculating the air compressor's efficiency and air flow is obtained while the air compressor is running, said method comprising running the compressor and adjusting said selectively operable means so as to create a substantially steady state operating condition for main line pressure and pressure across said orifice means while the air compressor is running, and measuring the power input required to operate the air compressor and the pressure across said orifice means to be used in calculating the efficiency of said running air compressor.

10. Method as set forth in claim 9 in which said selectively operable means comprises means for selectively setting the effective size of said orifice means and said method includes operating said selectively operable means to set an effective orifice size appropriate to the size of the particular air compressor being tested.

11. Method as set forth in claim 9 in which said selectively operable means comprises a by-pass control valve and a pressure regulator arranged in parallel relationship with each other in said circuit means and said method comprises selectively setting said by-pass control valve and pressure regulator to a particular setting to create the substantially steady state operating condition.

* * * * *